(12) United States Patent
Leyerle

(10) Patent No.: US 9,659,499 B2
(45) Date of Patent: May 23, 2017

(54) METHOD OF COMMUNICATING VEHICLE MESSAGES USING SHORT MESSAGE SYSTEM MESSAGES

(75) Inventor: James W. Leyerle, Pleasant Ridge, MI (US)

(73) Assignee: General Motors LLC, Detroit, MI (US)

( * ) Notice: Subject to any disclaimer, the term of this patent is extended or adjusted under 35 U.S.C. 154(b) by 1887 days.

(21) Appl. No.: 12/341,690

(22) Filed: Dec. 22, 2008

(65) Prior Publication Data

US 2010/0161167 A1  Jun. 24, 2010

(51) Int. Cl.
| G06F 7/00 | (2006.01) |
|---|---|
| H04W 4/12 | (2009.01) |
| G08G 1/00 | (2006.01) |
| H04W 28/06 | (2009.01) |
| H04W 4/14 | (2009.01) |
| H04W 80/04 | (2009.01) |
| H04J 1/14 | (2006.01) |
| H04J 3/12 | (2006.01) |

(52) U.S. Cl.
CPC .............. G08G 1/205 (2013.01); G08G 1/20 (2013.01); H04W 4/14 (2013.01); H04W 28/06 (2013.01); H04W 80/04 (2013.01); H04J 1/14 (2013.01); H04J 3/12 (2013.01)

(58) Field of Classification Search
CPC .......... G08G 1/205; G08G 1/20; H04W 4/14; H04W 80/04; H04W 28/06; H04J 1/14; H04J 3/12

USPC ........... 701/29; 455/466; 370/328–349, 496, 370/522
See application file for complete search history.

(56) References Cited

U.S. PATENT DOCUMENTS

| 7,228,211 | B1 * | 6/2007 | Lowrey et al. ................. 701/29 |
|---|---|---|---|
| 7,480,551 | B1 * | 1/2009 | Lowrey et al. ................. 701/29 |
| 2002/0038182 | A1 * | 3/2002 | Wong et al. .................. 701/213 |
| 2002/0049523 | A1 * | 4/2002 | Diaz et al. ..................... 701/33 |
| 2003/0009270 | A1 * | 1/2003 | Breed ............................ 701/29 |
| 2006/0132294 | A1 * | 6/2006 | Spark ........................ 340/426.1 |
| 2006/0253235 | A1 * | 11/2006 | Bi et al. ......................... 701/33 |
| 2007/0075848 | A1 * | 4/2007 | Pitt ............................ 340/426.2 |
| 2007/0093247 | A1 * | 4/2007 | Yaqub .......................... 455/436 |
| 2008/0026780 | A1 * | 1/2008 | Hart et al. ................... 455/466 |
| 2008/0036586 | A1 * | 2/2008 | Ohki ........................ 340/539.13 |
| 2008/0045274 | A1 * | 2/2008 | Witkowski et al. ........ 455/569.2 |
| 2008/0108335 | A1 * | 5/2008 | Jamali et al. .............. 455/414.3 |

FOREIGN PATENT DOCUMENTS

CN  101067744 A  11/2007

* cited by examiner

Primary Examiner — Jerrah Edwards
Assistant Examiner — Majdi Alsomiri
(74) Attorney, Agent, or Firm — Christopher DeVries; Reising Ethington P.C.

(57) ABSTRACT

A system and method for communicating reportable vehicle events via SMS messages. The method carried out by the system includes storing a user-provided contact at a vehicle, monitoring a plurality of vehicle conditions, detecting that one of the vehicle conditions has become a reportable vehicle condition, and sending a short-message service (SMS) message to the stored contact based on the determination, wherein the SMS message includes information associated with the reportable vehicle condition.

19 Claims, 2 Drawing Sheets

METHOD OF COMMUNICATING VEHICLE MESSAGES USING SHORT MESSAGE SYSTEM MESSAGES

TECHNICAL FIELD

The present invention relates generally to vehicles having integrated telematics systems and more particularly to techniques for wirelessly sending messages from vehicles using the telematics system.

BACKGROUND OF THE INVENTION

Vehicles today commonly come equipped with telematics systems or telematics units that communicate wirelessly with a call center and are interfaced to other system modules on the vehicle to monitor and control vehicle functions. Through monitoring various vehicle functions, the telematics units can thereby detect if an abnormal or other reportable vehicle condition or event occurs. And when the telematics unit senses a reportable vehicle event, the unit can store related information for subsequent upload to the call center. More serious conditions can be reported immediately. Once received, the call center then processes and stores this information so that it can be reported out to the customer or otherwise used as desired. For example, the information can be included in periodic communications with a vehicle owner, such as in diagnostic emails sent monthly via email.

SUMMARY OF THE INVENTION

According to an aspect of the invention, there is provided a method of communicating messages from a vehicle telematics unit. The method includes storing a user-provided contact at a vehicle, monitoring a plurality of vehicle conditions, detecting that one of the vehicle conditions has become a reportable vehicle condition, and sending a short-message service (SMS) message to the stored contact based on the determination, wherein the SMS message includes information associated with the reportable vehicle condition.

According to another aspect of the invention, there is provided a method of communicating messages from a vehicle telematics unit. The method includes storing a wireless device contact at the vehicle, monitoring vehicle data, detecting a reportable vehicle condition based on the vehicle data, generating a text message identifying the reportable vehicle condition, accessing the wireless device contact, and sending the text message as a short-message service (SMS) message to the accessed wireless device contact.

According to yet another aspect of the invention, a method of communicating messages from a vehicle telematics unit includes maintaining an address book of wireless telephone numbers at a telematics unit in a vehicle, associating each of at least some of the telephone numbers with at least one of a number of reportable vehicle conditions relating to the status of a vehicle, detecting that one of the reportable vehicle conditions exists, accessing the address book and obtaining one or more telephone numbers associated with the reportable vehicle condition that matches the existing vehicle condition, sending a short-message service (SMS) message to the obtained wireless number(s), creating a log of SMS messages sent and the wireless numbers to which the SMS messages were sent, and uploading the log to a call center.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT

Figure 1:
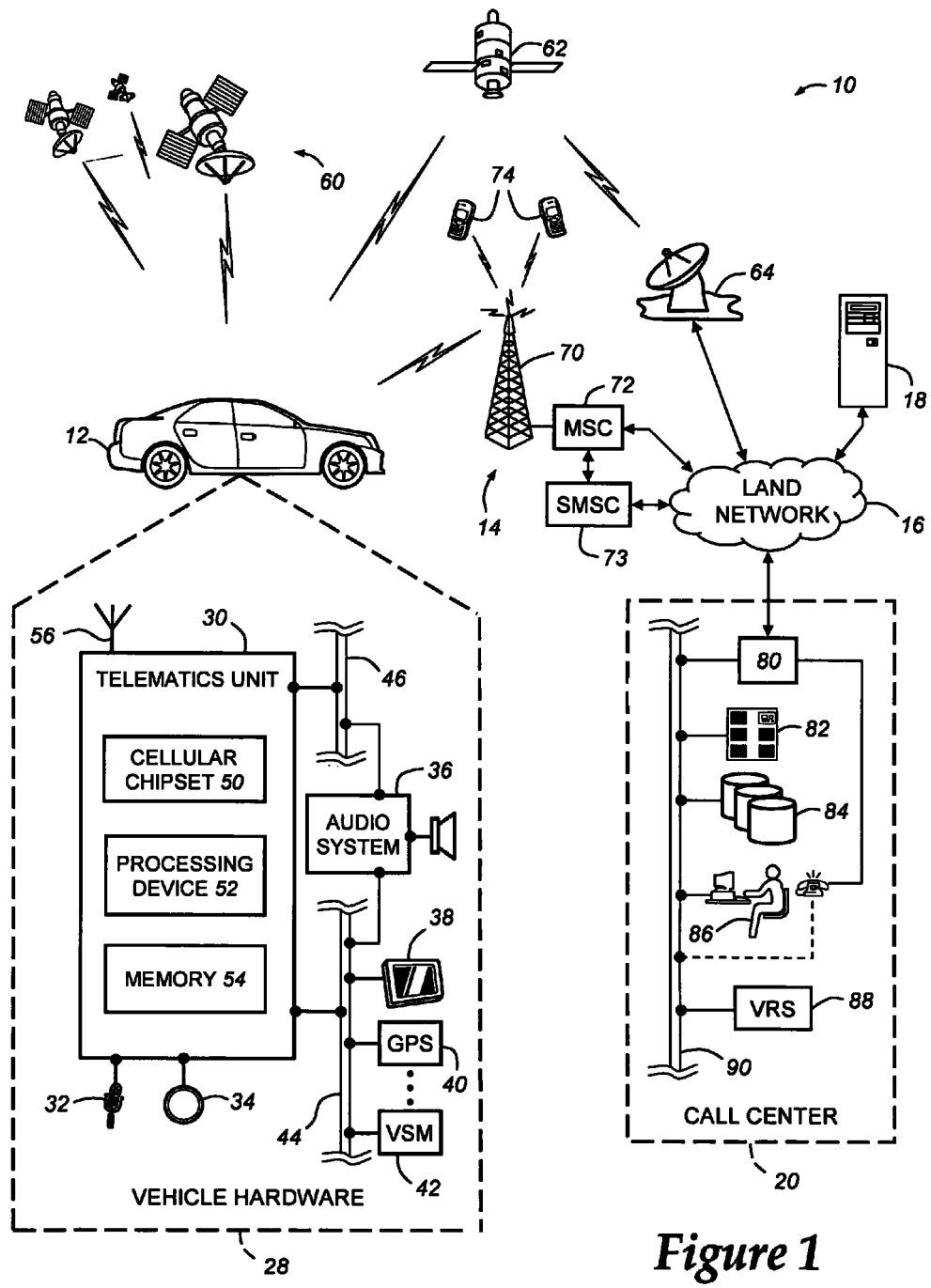
FIG. 1 is a block diagram depicting an exemplary embodiment of a communications system that is capable of utilizing the method disclosed herein.
Figure 2:
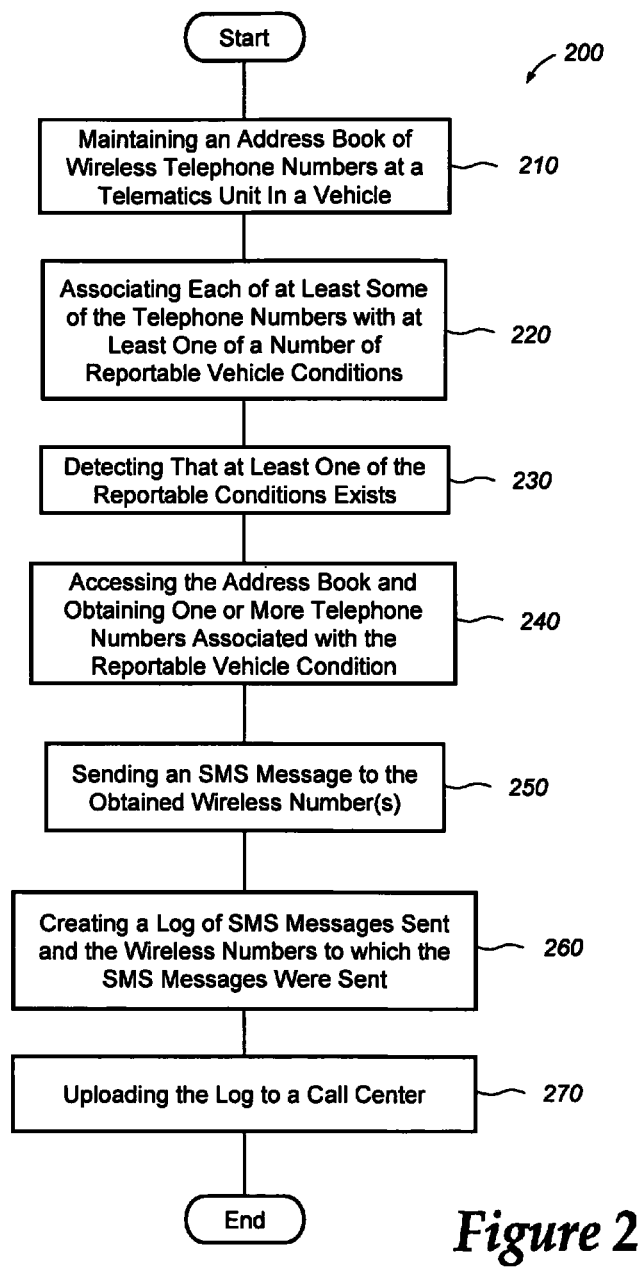
FIG. 2 is a flow chart depicting an embodiment of the inventive method disclosed herein.

The methods described below in connection with FIGS. 1 and 2 are directed to different embodiments of a method for notifying an interested party, such as a vehicle owner, using a short-message service (SMS) message about an abnormal or other reportable event relating to a vehicle. The SMS message can be sent to a vehicle operator or owner providing timely alerts regarding reportable vehicle conditions. Owners may find this helpful in a variety of circumstances including, for example, when the vehicle has been entrusted by its owner to another driver who may not be as attentive to vehicle maintenance as the owner. Even the least cynical among us can envision college-bound children paying minimal attention to the condition of a parent's vehicle. Additionally, the method reduces the processing burden of a call center that would normally be used to facilitate the notification of interested parties. The method provides a fairly direct communication path between the vehicle and interested party receiving the information. Additionally, SMS messaging can decrease the elapsed time between when the reportable vehicle event occurs and when an interested party can be notified.

As used herein, a vehicle condition or event refers to such things as vehicle operational conditions (e.g., oil level or pressure, tire pressure, vehicle speed, system malfunctions, etc.) as well as other usable information concerning the status of a vehicle (e.g., vehicle location, the triggering of a vehicle security alarm, etc.). A vehicle condition or event is reportable when it there is some reason for which it is desirable to inform someone of the vehicle condition or event. For example, a reportable vehicle condition can occur when a particular vehicle operational parameter rises above an established maximum value, falls below a minimum value, or outside of a range defined by minimum and maximum values. For other type conditions, such as vehicle location, a reportable vehicle event can occur, for example, when the vehicle is moved or is taken outside of a geographic area. Other such reportable vehicle conditions will become apparent to those skilled in the art.

Communications System—

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, AMPS, 3G, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein. Telematics unit 30 can also use the processor 52 for preparing and sending short-message service (SMS) messages. SMS messages, also now known more generically as "text messaging," involve sending alphanumeric and other characters from one wireless device to another. Originally used with a GSM mobile network, SMS messages can now be sent over nearly every network protocol such as CDMA, AMPS, and other protocols. SMS messages can originate at the vehicle 12 where telematics unit 30 can generate the SMS message using processor 52 and send the SMS message using the cellular chipset 50. The chipset 50 sends the SMS message via the wireless carrier system 14 to a short message system center (SMSC) 73. The SMSC 73 is responsible for handling the SMS messages for the wireless carrier system 14 and forwards the messages to the intended recipient (e.g. wireless device).

The telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit 30.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, a short message service center (SMSC) 73, as well as any other networking components required to connect wireless carrier system 14 with land network 16. Each cell tower 70 includes sending and receiving antennas and a base station, with the base stations from different cell towers being connected to the MSC 72 and SMSC 73 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC/SMSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements. The wireless carrier system 14 also involves communication with wireless devices 74 within range of cell towers 70. Wireless devices 74 can include devices capable of receiving SMS messages. For instance, examples of wireless devices 74 are cellular phones, personal digital assistants (PDAs), text pagers, and personal computers capable of receiving SMS messages.

Apart from using wireless carrier system 14, a different wireless carrier system in the form of satellite communication can be used to provide unidirectional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Turning now to FIG. 2, there is shown a method 200 of communicating messages from a vehicle telematics unit. The method 200 starts at block 210 and begins with the step of maintaining an address book of wireless telephone numbers at a telematics unit in a vehicle. A user can specify one or more wireless numbers to which a message is sent when a reportable vehicle condition occurs. The address book need not have any particular format or structure, and it can be a dedicated address book used only for the method of FIG. 2 or can be one used for other purposes, such as one maintained by the vehicle driver for personal or business use. The wireless telephone numbers generally are a string of digits that represent a telephone number or pager number of a particular wireless user. For instance, a wireless number can be the ten-digit telephone number of a wireless device or cell phone. An address book can include a plurality of wireless telephone numbers, wireless telephone numbers associated with reportable vehicle conditions, or wireless telephone numbers, names associated with wireless telephone numbers, and reportable vehicle conditions associated with the wireless telephone numbers. The aforementioned information can also be called a contact or contact information. Additional digits, prefixes or suffixes, may be added for international telephone numbers. The address book can be created using a variety of inputs. In one example, the visual display 38 can provide a menu screen and numerical keypad that prompts the user to enter the wireless telephone number or contact. The user could then enter the wireless telephone number by pressing the appropriate keys on the numerical keypad. In other embodiments, the address book can be populated with entries that are synced, converted, or otherwise supplied from another address book.

In another example, the user can recite the wireless telephone number into the microphone 32 and with the assistance of an automatic speech recognition (ASR) system familiar to those skilled in the art, and the wireless telephone number can be saved at the vehicle 12 in memory 54 of the telematics unit 30. When the user stores the wireless telephone number, the visual display 38 or audio system 36 can also enable the user to associate the wireless telephone number with a particular word or name. Other suitable means of entering contacts can be used. For example, a wireless number can be entered by the user via the computer 18 and then downloaded to the vehicle. This can be done via a web portal maintained by the call center for that purpose. The call center 20 could receive the wireless telephone number and communicate it to the vehicle 12 where it can be stored in memory, such as digital memory devices 54 at the telematics unit 30. Apart from wireless telephone numbers, other contact information can be used, such as an email address that is associated with the wireless device 74 via a server that converts the message contents of an email into an SMS message that it then sends to the wireless device. The method 200 then proceeds to block 220.

At block 220, each of at least some of the wireless telephone numbers are associated with at least one of a number of reportable vehicle conditions relating to the status of a vehicle. For instance, vehicles 12 periodically require different types of service, such as oil changes, transmission fluid changes, gearbox oil changes, coolant changes, light bulb changes, and other replacement service. In addition, between vehicle servicings and for various reasons, oil-quality levels, fluid levels, tire-pressure levels, and other vehicle operational conditions may change and rise above or fall below recommended amounts. In other words, a reportable vehicle condition or event may exist for which the vehicle 12 should be serviced, such as when engine oil should be changed or tire pressure should be increased. And certain types of service or reportable vehicle events may be associated with different wireless telephone numbers. As an example, one wireless telephone number can be stored as a contact for any reportable vehicle condition. Or differently put, if any reportable vehicle condition occurs, that wireless telephone number will be contacted. Alternatively, one wireless telephone number can be associated with one vehicle condition (e.g., tire pressure) whereas another wireless telephone number can be associated with a different vehicle condition (e.g., low oil level) Accordingly, only when the vehicle 12 requires oil to be added will that second wireless telephone number be contacted. This situation could be helpful to attribute a local mechanic's wireless telephone number to a particular reportable vehicle condition where the mechanic only services one aspect of the vehicle 12. The method 200 then proceeds to block 230.

At block 230, the method includes detecting that at least one of the reportable vehicle conditions exists. As discussed above, the vehicle 12 includes various vehicle system modules 42. These modules 42 can include various sensors or diagnostic modules that monitor reportable vehicle conditions. The above examples include engine control modules, powertrain control modules, and the ability to gather vehicle diagnostic trouble codes (DTCs). These modules 42 can provide feedback regarding nearly every vehicle condition to the telematics unit 30. Selected levels can be established as benchmarks to which the feedback can be compared. In one example, a vehicle 12 may benefit from a tire pressure that falls between 31-34 pounds per square inch (PSI). When a vehicle module 42 or vehicle sensor provides feedback indicating that the tire pressure is below or above the range of 31-34 PSI, a reportable vehicle condition may be present. The ranges can be as simple or as complex as the vehicle owner/user or vehicle manufacturer desires. In the present case, different tire pressure ranges can be assigned for each wheel. And the ranges or benchmarks can be further specified based on seasonal weather differences. Referring again to the present example, the tire pressure ranges for each tire can vary depending on the time of the year and the location of the vehicle 12, all of which can be established either by the telematics unit 30 or the call center 20. When the vehicle 12 is located in a geographical region where the temperature increases or decreases significantly, the tire pressure range may need to be modified. As another example, a reportable vehicle condition can involve the vehicle moving outside of a particular geographic area, and this can be determined using the GPS module 40 with the telematics unit 30 then sending an appropriate SMS message when this condition occurs.

At block 240, the address book is accessed to obtain one or more telephone numbers associated with the reportable vehicle condition. Using the processing device 52, the telematics unit 30 can search the address book for wireless telephone numbers that have been associated with the reportable vehicle condition. The telematics device 30 can search for these associations using various techniques known to those skilled in the art. After identifying the wireless telephone numbers associated with the reportable vehicle condition, the wireless telephone number or numbers can be grouped. The method 200 then proceeds to block 250.

At block 250, a short-message service (SMS) message is sent to the obtained wireless numbers. Using identified wireless telephone number or numbers, an SMS message can be generated and sent to the/those identified number(s). For instance, the SMS message can include information relating to the reportable vehicle condition. Additionally or alternatively the SMS message can include information regarding how to remedy the reportable vehicle condition or who to call that could fix the condition. For instance, using the above example involving low tire pressure, the vehicle telematics unit 30 sends an SMS message that includes information identifying the vehicle 12, such as make, model, and year, as well as the actual tire pressured measured on the vehicle 12 and the recommended range of tire pressure(s) with which the tire(s) should be inflated. In another example, a vehicle module 42 could sense that the vehicle 12 is due for an oil change. The module 42 could also sense that a predetermined amount of miles had been driven since the last oil change or that an oil life indicator determined that the engine oil could be replaced. In this case, the SMS message can include the date and/or mileage of the last oil change, the present mileage, the present date, and/or type and quantity of oil to be used for the oil change. Additionally, the SMS message could include a list of local service facilities determined by directing the vehicle 12 to note its present location and querying the call center 20 for information regarding local service facilities.

The telematics unit 30 could then generate an SMS message using the processing device 52 and send the message via the cellular chipset 50 and dual antenna 56. The wireless network 14 can receive the SMS message and using the SMSC 73 to route the SMS message to the appropriate wireless device(s) 74. Similarly, a second SMS message can be sent using this process when any reportable vehicle condition ceases to exist or the reportable condition has re-entered the benchmark ranges. This second SMS message can contain information that identifies the vehicle 12, acknowledges the first SMS message, and indicates the reportable vehicle condition has been resolved. The method 200 then proceeds to block 260.

At block 260, an SMS message log is created. That is, once the appropriate SMS messages have been sent, or during the sending process, the telematics unit 30 can create a log of the SMS messages sent and the wireless telephone numbers to which they have been sent. Creating of the log can be done by creating a log file where none previously existed or by updating an existing log file with a new entry. The log can include the content of the SMS message(s), the day, time and year the SMS message(s) was sent, and the wireless telephone number(s) to which the SMS message(s) were sent. The log can be stored in any type of memory on a vehicle, such as memory 54. The method 200 then proceeds to block 270.

At block 270, the log is uploaded to a call center. During the periodic communications between the call center 30 and the vehicle 12, the log created at block 260 can be sent to the call center 20. This upload can be in response to a command or query from the call center or as part of a periodic automatic upload of vehicle information. After successfully sending the log to the call center 20, the vehicle 12 can delete the log or begin the log anew. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of communicating messages from a vehicle telematics unit, comprising the steps of:
   (a) storing a user-provided contact along with one or more wireless numbers each of which is associated with a reportable vehicle condition at a vehicle;
   (b) monitoring a plurality of vehicle conditions;
   (c) detecting that one of the vehicle conditions has become a reportable vehicle condition;
   (d) matching the detected vehicle condition with the reportable vehicle condition associated with the one or more wireless numbers; and
   (e) sending a short-message service (SMS) message to the matching wireless number after the reportable vehicle condition associated with that contact is detected, wherein the SMS message includes information associated with the reportable vehicle condition.

2. The method of claim 1, wherein the contact is a wireless telephone number of a device that supports SMS messages and wherein the method further comprises the steps of:
   prompting the user to enter the wireless telephone number into the vehicle telematics unit via an in-vehicle microphone or keypad;
   receiving the telephone number at the microphone or keypad from the user; and
   storing the telephone number in the vehicle.

3. The method of claim 1, wherein step (b) further comprises monitoring a plurality of vehicle sensor measurements that include one or more of the following: oil-level measurements, oil quality measurements, tire pressure measurements, or measurements that trigger a diagnostic trouble code.

4. The method of claim 3, wherein step (c) further comprises detecting the reportable vehicle condition by detecting a diagnostic trouble code resulting from one of the vehicle sensor measurements, and wherein step (d) further comprises sending an SMS message associated with the diagnostic trouble code.

5. The method of claim 3, wherein for each vehicle sensor measurement, there is an associated reportable vehicle condition that comprises a value above a maximum value, below a minimum value, or outside of a range defined by minimum and maximum values.

6. The method of claim 1, further comprising:
   creating a log of SMS messages sent to a contact; and
   uploading the log to a call center.

7. A method of communicating messages from a vehicle, comprising the steps of:
   (a) storing a wireless device contact at the vehicle;
   (b) monitoring vehicle data;
   (c) detecting a reportable vehicle condition based on the vehicle data;
   (d) determining if the detected reportable vehicle condition is stored with the wireless device contact stored at the vehicle;
   (e) if so, generating a text message identifying the reportable vehicle condition;
   (f) accessing the wireless device contact; and
   (g) sending the text message as a short-message service (SMS) message to the accessed wireless device contact.

8. The method of claim 7, wherein the wireless device contact is a telephone number of a wireless device that supports SMS messages and wherein step (a) further comprises the steps of:
   prompting the user to enter the wireless telephone number into a vehicle telematics unit via an in-vehicle microphone or keypad;
   receiving the telephone number at the microphone or keypad from the user; and
   storing the telephone number in the vehicle.

9. The method of claim 7, wherein the wireless device contact is a telephone number of a wireless device that supports SMS messages and wherein step (a) further comprises receiving the telephone number from a call center and storing the telephone number at the vehicle.

10. The method of claim 7, wherein the vehicle data comprises measurements from vehicle sensors and wherein step (c) further comprises the step of determining that the reportable vehicle condition exists in response to one of the vehicle sensors having a measurement that has exceeded a maximum value, fallen below a minimum value, or has moved outside of a range defined by minimum and maximum values.

11. The method of claim 10, further comprising the steps of continuing monitoring of the one vehicle sensor and sending a second SMS message to the accessed wireless device contact when the measurement from the one vehicle sensor indicates that the reportable vehicle condition no longer exists.

12. The method of claim 10, wherein the reportable vehicle condition comprises a measurement from the one vehicle sensor that falls outside of a range of values established by the user or a manufacturer and stored at the vehicle.

13. A method of communicating messages from a vehicle telematics unit, comprising the steps of:
   (a) maintaining an address book of wireless telephone numbers at a telematics unit in a vehicle;
   (b) storing each of at least some of the telephone numbers with at least one of a number of reportable vehicle conditions relating to the status of a vehicle;
   (c) detecting that one of the reportable vehicle conditions exists;
   (d) accessing the address book and obtaining one or more telephone numbers associated with the reportable vehicle condition that matches the existing vehicle condition;
   (e) sending a short-message service (SMS) message to the obtained wireless number(s);
   (f) creating a log of SMS messages sent and the wireless numbers to which the SMS messages were sent; and
   (g) uploading the log to a call center.

14. The method of claim 13, further comprising the steps of:
   prompting the user to enter the telephone numbers into the telematics unit via an in-vehicle microphone or keypad;
   receiving the telephone numbers at the microphone or keypad from the user; and
   storing the telephone numbers in the vehicle.

15. The method of claim 13, wherein at least some of the telephone numbers stored in the address book are stored with a name.

16. The method of claim 13, wherein step (c) further comprises monitoring a plurality of vehicle sensors for measurements that include one or more of the following: oil-level measurements, oil quality measurements, tire pressure measurements, or measurements that trigger a diagnostic trouble code.

17. The method of claim 16, wherein step (c) further comprises detecting whether measurements from at least some of the vehicle sensors are above or below a defined range.

18. The method of claim 13, further comprising the step of sending a second SMS message to the wireless number(s) used in step (e) when the vehicle condition no longer exists.

19. The method of claim 13, wherein step (a) further comprises receiving one or more of the telephone numbers in the address book from a call center.

\* \* \* \* \*